(12) United States Patent
Mittendorf, Jr.

(10) Patent No.: US 6,386,059 B1
(45) Date of Patent: May 14, 2002

(54) ADJUSTABLE SPEED REDUCER ASSEMBLY

(75) Inventor: Robert John Mittendorf, Jr., Traverse City, MI (US)

(73) Assignee: Cone Drive Operations, Inc., Traverse City, MI (US)

( * ) Notice: Subject to any disclaimer, the term of this patent is extended or adjusted under 35 U.S.C. 154(b) by 0 days.

(21) Appl. No.: 09/616,418

(22) Filed: Jul. 14, 2000

(51) Int. Cl.[7] .............................. F16H 55/24; F16H 1/16
(52) U.S. Cl. .............................. 74/409; 74/400; 74/425
(58) Field of Search ........................ 74/425, 409, 440, 74/395, 400, 401

(56) References Cited

U.S. PATENT DOCUMENTS

| | | | |
|---|---|---|---|
| 2,786,360 A | * 3/1957 | Cameron | 74/409 |
| 4,261,218 A | 4/1981 | Eagan | |
| 4,739,671 A | * 4/1988 | Nelson | 74/425 |
| 6,050,557 A | * 4/2000 | Shimoseki | 267/162 |

FOREIGN PATENT DOCUMENTS

| | | | |
|---|---|---|---|
| DE | 33 44 133 | * | 6/1985 |
| EP | 0 527 121 | * | 2/1993 |
| JP | 3-61751 | * | 3/1991 |
| JP | 4-29664 | * | 1/1992 |
| JP | 5-118409 | * | 5/1993 |

OTHER PUBLICATIONS

WhisperDrive Servo Precision Gearhead Product Catalog by Cone Drive Operations, Inc. p. 6.

* cited by examiner

*Primary Examiner*—Thomas R. Hannon
*Assistant Examiner*—William C Joyce
(74) *Attorney, Agent, or Firm*—Trexler, Bushnell, Giangiorgi, Blackstone & Marr, Ltd.

(57) ABSTRACT

A speed reducer having a split worm gear with a fixed segment and a floating segment capable of axial movement. The position of the floating segment is maintained in part through a spring assembly and an adjuster. The adjuster, which extends outside the gear head housing, allows for adjustment to the spring force without requiring the gear head to be disassembled or the housing to be opened. A load cell rack is used to initially set and measure the spring force with accuracy. An indicator plaque and tabulations of spring force calculations can be used to make field adjustment to the spring force.

4 Claims, 3 Drawing Sheets

ADJUSTABLE SPEED REDUCER ASSEMBLY

BACKGROUND OF THE INVENTION

This invention is generally directed to a an improved adjustable speed reducer assembly. More particularly, the invention contemplates a speed reducer assembly which implements a split worm whose spring force can be easily adjusted.

Speed reducers have been used to transmit motion and power between non-intersecting shafts generally at right angles to one another. A typical speed reducer consists of an input shaft with threads and a toothed wheel or circular gear. The threaded input shaft, which is referred to as the worm is aligned to mesh with the teeth on the circular gear. A transfer of power occurs as the threads on the worm slide into contact with the teeth of the circular gear causing the circular gear to turn.

A common form of speed reducer uses a cylindrically shaped worm. The thread of the cylindrically shaped worm is of uniform diameter and generally contacts only a few wheel teeth. The number of teeth which the worm contacts can be significantly increased if the shape of the worm is modified from a cylindrical to conical. The conical worm is narrower at its center where it meets the top of the circular gear and wider at its ends conforming to the arc of the circular gear. The conical worm is sometimes referred to as a "double-enveloping" worm. Because the "double-enveloping" worm conforms to the arc of the circular gear, the worm thread contacts many more teeth on the circular gear. This additional contact between the worm thread and the circular gear's teeth increases the torque throughput allowing for higher load capacities, improved accuracy and reduced stress levels in the contact area thus extending the operating life of the speed reducer assembly.

A common problem encountered with the use of speed reducers is backlash. Backlash is generally defined as the play between the worm thread and the mating teeth. Backlash results in imprecise angular positioning of the speed reducer output shaft. Use of a double enveloping worm, rather than a cylindrically shaped worm, can reduce the backlash in a speed reducer.

The reduction of backlash in the speed reducer allows for the speed reducer to be used in industries which require precise positioning and increased throughput. For example, metal cutting and forming machinery requires accuracy in the position of a work piece even if the work piece is heavy and repeated starting and stopping is necessary. In machinery used in printing and packaging applications, double enveloping worm gearing helps printing press rolls maintain precise print registration at very high speeds.

The backlash can be further reduced by using a split worm. A split worm is a worm which is formed with two worm segments placed together at the axial center of the worm thread. One segment of the worm is fixed in its bearing set, while the other segment is positioned laterally and is capable of reciprocal movement along the worm's axis and thus is referred to as the floating worm segment. Springs are implemented to manipulate the position of the floating worm segment so that a consistent clamping force is maintained on both sides of the gear. Half of the worm contacts the drive side of the gear while the other half of the worm makes continuous contact with the opposing side of the gear. The result of this split worm gear design is the elimination of backlash, making it ideal for applications which require extremely accurate positioning.

With this split worm arrangement, the spring force requirement on the floating worm segment is unique for each application. If the spring force is too light to resist the torque on the loaded gear, the worm will move out of position, misalign the gear mesh and destroy the gearset. If the spring force is too great, the system will require excessive force to turn, and will rapidly wear the gear.

The process of determining the proper spring force begins by determining output torque requirement. Using the output torque requirement, the spring force required to resist that output torque is then calculated. Springs are then selected and spacers are either added or removed to achieve the desired spring force. Removing additional spacers increases the spring force by incrementally compressing the spring within a fixed space. The spacers are provided in a variety of widths so as to allow for controlled incremental compression of the spring.

Setting the spring force on the split worm gear in this manner results in a number of difficulties. One such difficulty is that the measurement given for the desired output torque is often inaccurate. The inaccurate torque measurement often is not discovered until the spring force has been set, the housing has been reassembled and the speed reducer has been implemented. To adjust the spring force at this point requires first that the housing be opened and then requires that springs and/or spacers are added or removed to achieve the proper spring force. Often the spring force is set by the manufacturer and the speed reducer assembly is then shipped to a customer. The manufacturer sets the spring force based upon the customer provided measurement and calculation of the required spring force. Depending upon the accuracy of the measurements and calculations and how the speed reducer has been implemented, it may be necessary for a technician to travel to the site where the speed reducer assembly has been implemented to make the spring force adjustments. This, of course, adds to the cost of the speed reducer.

Another problem with the current method of setting the spring force is that springs are selected and implemented based upon their theoretical spring force ratings. However, there are high tolerances within these spring force ratings and inaccurate spring force settings result.

The present invention provides an adjustable speed reducer assembly which overcomes the problems presented in the prior art and which provides additional advantages over the prior art, such advantages will become clear upon a reading of the attached specification in combination with a study of the drawings.

OBJECTS AND SUMMARY OF THE INVENTION

A general object of the present invention is to provide a speed reducer assembly with a minimal amount of backlash.

An object of the present invention is to provide a speed reducer assembly whose spring force can be easily adjusted.

Another object of the present invention is to provide a speed reducer assembly whose spring force can be accurately measured.

A further object of the present invention is to provide a device for measuring the spring force within a speed reducer assembly.

Briefly, and in accordance with the foregoing, the present invention discloses an improved speed reducer assembly and a method and apparatus for accurately setting the spring force within the speed reducer assembly. The spring force within the speed reducer assembly is adjusted by rotating an adjuster which extends beyond the speed reducer housing, thus allowing adjustments to be made without disassembling the speed reducer.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
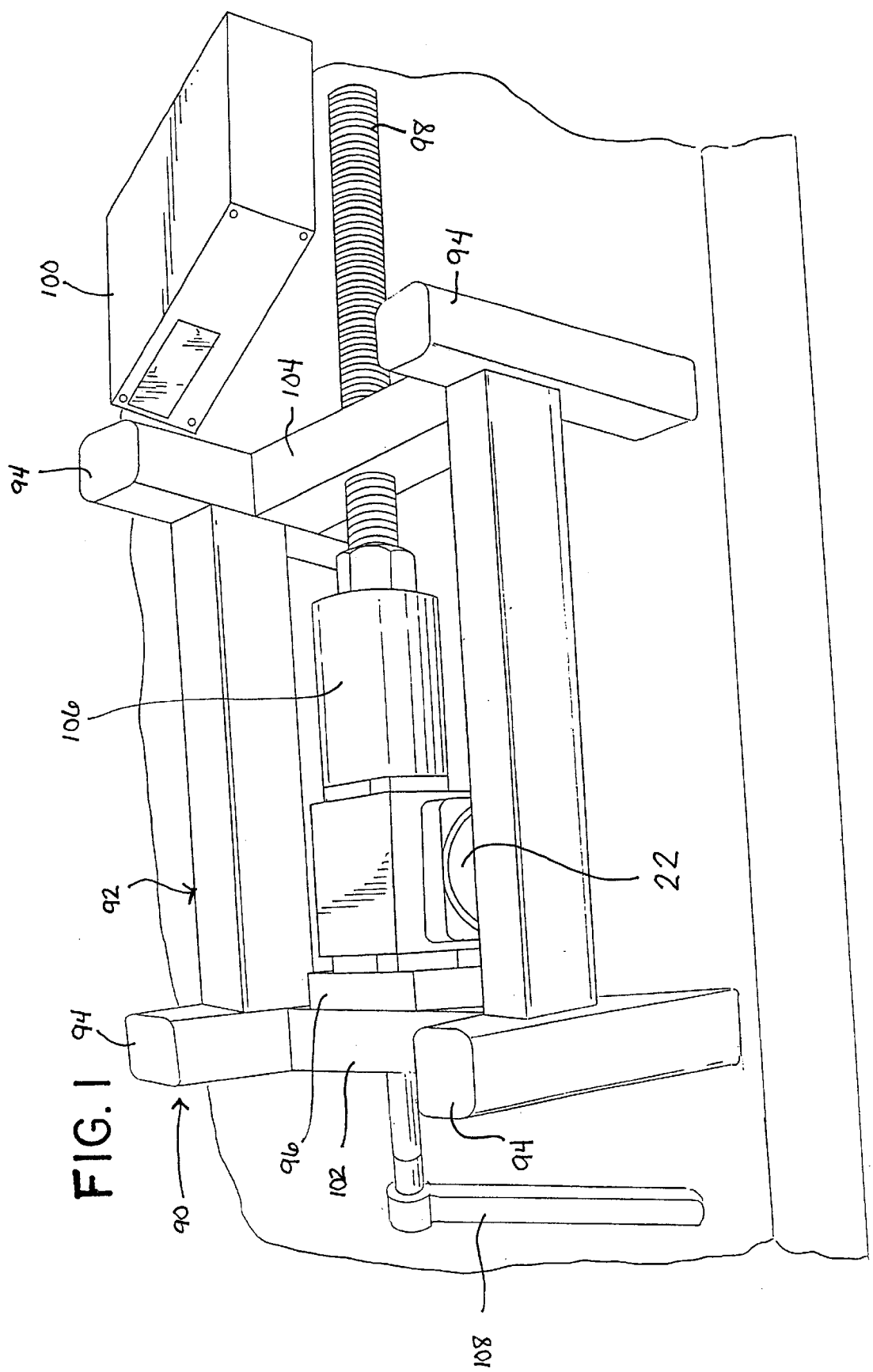
FIG. 1 is a perspective view of a load cell rack designed to measure the spring force within the speed reducer assembly.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 2:
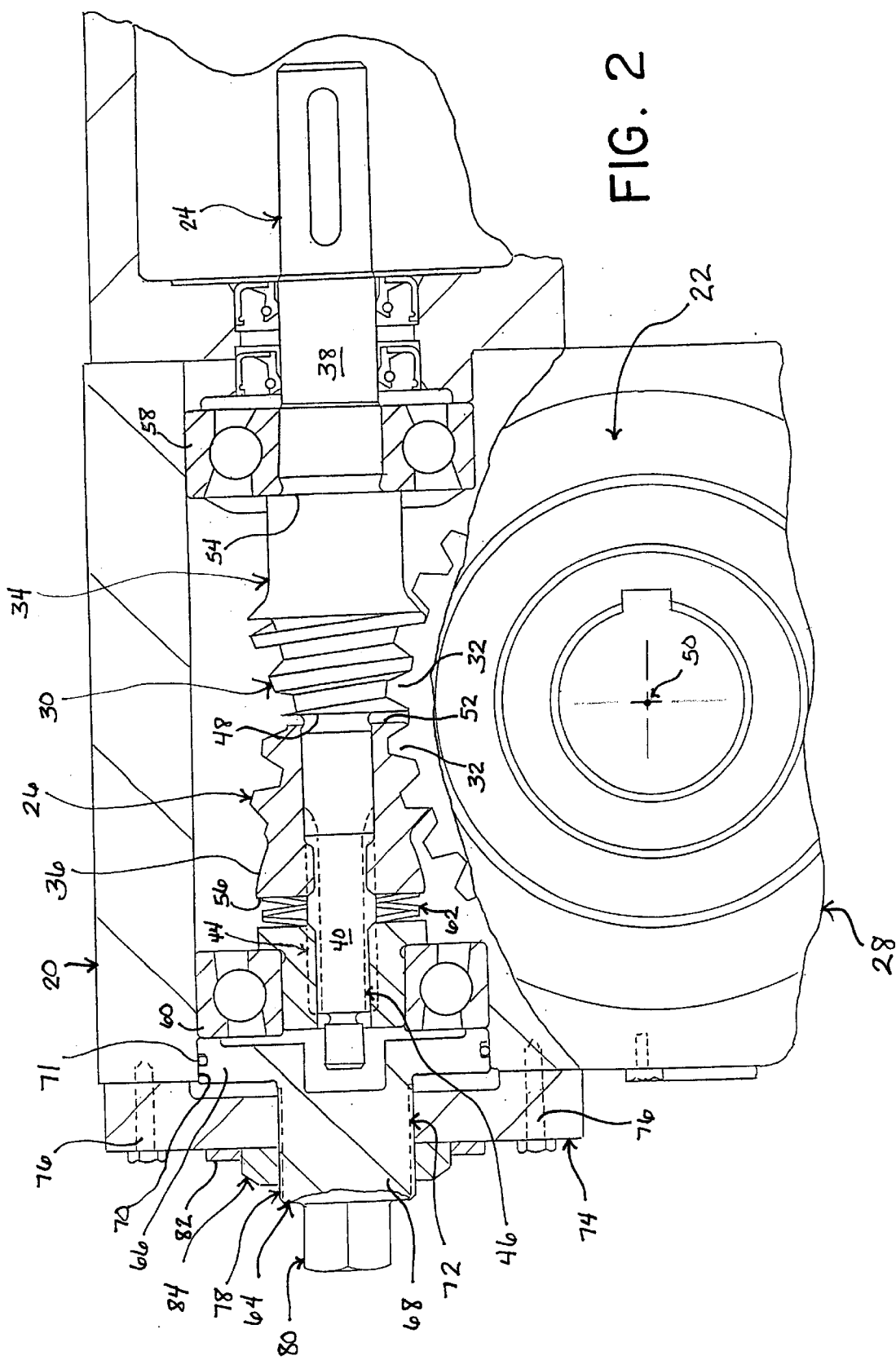
FIG. 2 is a partial fragmentary, cross-section, side elevational view of the improved speed reducer assembly.

Attention is first drawn to FIG. 2. A housing 20 contains a speed reducer assembly 22. The speed reducer assembly 22 generally includes an input shaft 24, a worm 26 and a circular gear or wheel 28. As the input shaft 24 is rotated, power is transferred to the wheel 28 by way of the thread 30 which meshes with teeth 32 of the wheel 28.

The worm 26 is comprised of a fixed worm segment 34 and a floating worm segment 36. The input shaft 24 includes a splined portion 40 extending axially from the inner end 48 of the fixed worm segment 34 and a smooth portion 38 extending from the outer end 54 of the fixed worm segment 34. The input shaft 24 and the fixed worm segment 34 are positioned such that the inner end 48 of the fixed worm segment 34 is aligned with the center 50 of the wheel 28.

The floating worm segment 36 is slidably mounted to the splined portion 40 of the input shaft 24 and is positioned so that the inner end 52 of the floating worm segment 36 is aligned with the center 50 of the wheel 28 and proximate to the inner end 48 of the fixed worm segment 34. The thread 30 is formed such that when the inner end 52 of the floating worm segment 36 is proximate to the inner end 48 of the fixed worm segment 34 a nearly continuous thread is formed from the fixed worm segment 34 to the floating worm segment 36. The input shaft 24 is mounted within the housing 20 such that the thread 30 meshes with the teeth 32 of the wheel.

In the embodiment described and shown in the drawings, the diameter of the fixed worm segment 34 is narrower at its inner end 48 than at its outer end 54. The diameter of the floating worm segment 36 is also narrower at its inner end 52 than at its out end 56. Thus the fixed worm segment 34 and the floating worm segment 36 together form a double-enveloping worm. Although the embodiment shown implements a double-enveloping worm, a cylindrically shaped worm could also be implemented.

The smooth portion 38 of the input shaft 24 extends through and is supported by a first bearing assembly 58 which is mounted in the housing 20. The splined portion 40 of the input shaft 24 extends through and is supported by a second bearing assembly 60 which is mounted on the housing 20.

The inner diameter of the floating worm segment 36 contains a spline which mates with a reciprocating spline 46 on the splined portion 40 of the input shaft 24. The spline allows for the transfer of torque from the input shaft 24 to the floating worm segment 36. The inner diameter of the second bearing assembly 60 also contains a spline which mates with a reciprocating spline 46 on the splined portion 40 of the input shaft 24.

A spring assembly 62 is located at the outer end 56 of the floating worm segment 36 between the floating worm segment 36 and the second bearing assembly 60. The springs shown are disc springs, however, it is expected that one skilled in the art could substitute another form of spring to achieve a similar or identical function. Because the floating worm segment 36 is capable of axial movement, the spring assembly 62 acts to force the floating worm segment 36 toward the fixed worm segment 34. The result is a constant, firm, yet moveable clamping force applied to both sides of the wheel teeth 32.

An adjuster 64 is mounted proximate to the second bearing assembly 60. The adjuster 64 has an inner portion 66 and an outer portion 68. The inner portion 66 of the adjuster 64 is generally cylindrically shaped and its diameter is the generally the same as the diameter of the second bearing assembly 60. The inner portion 66 of the adjuster 64 is mounted within an aperture 70 in the housing 20. An O-ring 71 encircles the inner portion 66 of the adjuster 64. The outer portion 68 of the adjuster 64 is also generally cylindrically shaped and has a smaller diameter than the inner portion 66 and extends through an aperture 72 located at the center of an adjuster cap 74.

The adjuster cap 74 is mounted to the housing 20 through the use of screws 76. Threads 78 are located on the surface of the outer portion of the adjuster which mate with reciprocal threads in the hole of the adjuster cap 74. The mating threads allow the adjuster 64 to be rotated and secured into a desired position. The inner portion 66 of the adjuster 64 contacts the second bearing assembly 60.

As the adjuster 64 is rotated in one threaded direction, the inner portion 66 of the adjuster 64 pushes the second bearing assembly 60 inward which results in compression of the spring assembly 62. Rotation of the adjuster 64 in the opposite direction results in relaxation of the force on the spring assembly 62 which forces the second bearing assembly 60 outward. As noted above, compression or relaxation of the spring assembly 62 will depend on the direction the adjuster 64 is rotated. The adjuster 64 functions to controllably, precisely set the desired spring force.

A drive structure, such as wrench flats 80, is located at the outer end of the adjuster 64 so that the adjuster can be easily rotated. The adjuster provides a means for adjusting the spring force without requiring the disassembly of the speed reducer or opening of the speed reducer housing.

Figure 3:
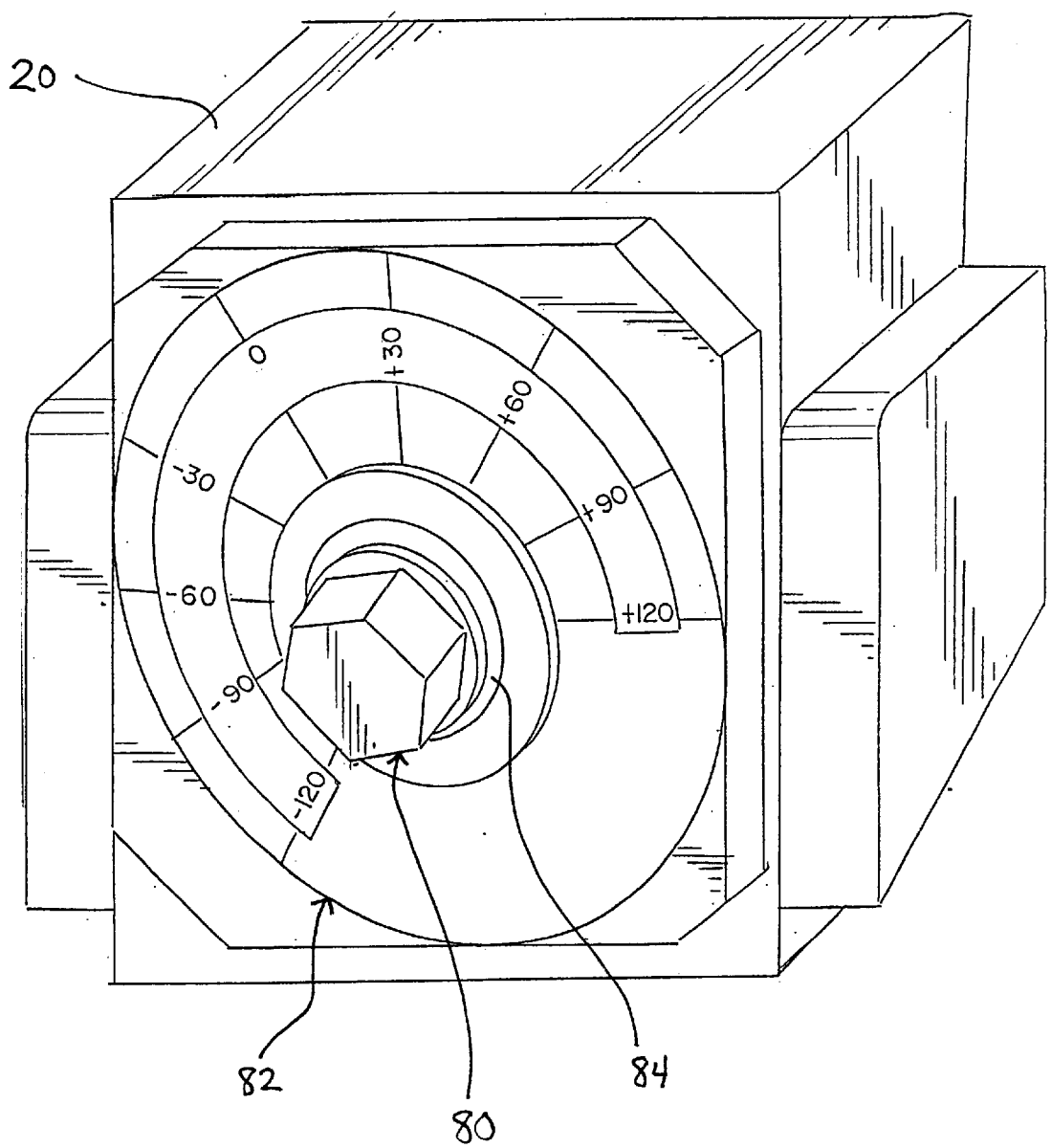
FIG. 3 is a perspective view of an adjustment end of the improved speed reducer assembly.

An indicator ring plaque 82 is mounted on the adjuster cap 74 and includes indicia to mark the degree to which the adjuster 64 has been rotated. FIG. 3 depicts this indicator ring. The additional compression or relaxation of the spring assembly can be determined by observing the degree to which the adjuster has been rotated as indicated relative to the indicia on the ring. Using measured angles of rotation and the pitch of the adjuster screw the change in compression or relaxation can be calculated and the change in the spring force can be tabulated. Tables indicating the degree to which the adjuster should be rotated in order to achieve a desired spring force can then be provided to make accurate field adjustments. Such field adjustments might be accomplished by the end user thereby, possibly, eliminating the need for a skilled technician to attend to such adjustments in the field.

A jamming lock nut 84 is placed over the indicator plaque 82 and around the adjuster 64, proximate to the adjuster cap 74 to prevent inadvertent rotation of the adjuster 64. Once the adjuster is set to a pre-determined setting while being assembled, the lock nut 84 is tightened to maintain the "factory" setting. If adjustments are required in the field, the nut 84 is loosened and the adjustment is made to the assembly according to the tabular information and the indicia on the indicator 82. Once the desired setting is achieved, the nut 84 is tightened to prevent inadvertent rotation.

To assemble this adjustable speed reducer the desired output torque is first determined. From this value the necessary spring force is calculated. The desired spring force determines which springs will be used. For example, the theoretical spring force value of disc springs can be used to create a spring assembly of the desired spring force. The free height of this spring assembly is then calculated. Spacers are placed between the floating worm segment and the second bearing assembly. These spacers have the same thickness as the free height of the springs. In other words, the spacers occupy the same dimension as the unloaded springs, this assures that the unloaded spring dimension is maintained and the springs are not compressed once installed.

The worm is then removed from the housing, the spacers are removed and the springs are put in place and the speed reducer housing is then reassembled. The result is an assembly with a spring force of zero. The spring assemblies are configured to provide a fall range of force, from the lightest to the greatest required for the particular speed reducer assembly. This will make each speed reducer assembly adjustable generally throughout its entire operating range, at assembly and in the field, without changing shims, springs or spacers. Because the spring force is accurately set at assembly, changing the spring force in the field is predictable.

Once the speed reducer assembly is complete, the actual spring force must be measured and adjusted if necessary. This is accomplished using a load cell rack. A load cell rack 90 is depicted in FIG. 1.

The load cell rack consists of a horizontal frame 92, four corner posts 94, a clamp 96, a screw 98 for adjusting the clamp 94 and a load cell and a display 100 for measuring the amount of force on the spring assembly 62. The horizontal frame 92 consists of four members which generally form a rectangle. Each corner of the horizontal frame is supported by a vertical post 94. The posts 94 act to raise the frame 92 from the ground. The speed reducer assembly 22 is supported within the frame by clamping it between a first member of the horizontal frame 102 and a screw 98 extending from a second horizontal frame member 104 opposite the first member. The gear assembly 22 is positioned within the frame such that the adjuster 64 protrudes through an aperture in the first member of the horizontal frame and the housing at the opposite end of the speed reducer assembly is supported by the screw. A load cell, of known construction, located inside the sleeve 106 measures the force on the input shaft. This measurement is displayed on the digital display 100. The adjuster 64 can be accessed with a wrench 108 through the opening in the first horizontal frame member 102. By rotating the wrench 108 the spring assembly 62 can be compressed or relaxed increasing or decreasing the spring force. As the spring force is adjusted, the digital display 100 can be observed to determine the spring force on the input shaft. Once the appropriate spring force has been achieved, the locknut 84 is tightened to prevent inadvertent rotation of the adjuster 64.

While a preferred embodiment of the present invention is shown and described, it is envisioned that those skilled in the art may devise various modifications of the present invention without departing from the spirit and scope of the appended claims.

The invention claimed is:

1. A speed reducer assembly comprising;

a housing;

a fixed worm segment, said fixed worm segment defining an axis of rotation;

a shaft extending from said fixed worm segment, generally concentric with said axis of rotation;

a floating worm segment axially positioned on said shaft;

a first bearing assembly mounted at the outer end of the fixed worm segment; and a second bearing assembly mounted at the outer end of the floating worm segment;

means for transmitting torque from said shaft to said floating worm segment and said second bearing assembly;

a spring assembly positioned on said shaft proximate to the outer end of said floating worm segment;

a thread along the length of said fixed worm segment and said floating worm segment for engagement with a worm wheel; and means for controllably adjusting a force on said spring assembly;

wherein said means for controllably adjusting a force on said spring assembly is an adjuster cap secured to said housing with a hole therethrough and an adjuster extending through said hole and threadedly mated to said adjuster cap.

2. A speed reducer assembly as defined in claim 1, further comprising a locking nut for preventing inadvertent movement of said adjuster.

3. A speed reducer assembly as defined in claim 1, wherein the outer end of said adjuster includes surfaces suitable for applying force to said adjuster with a wrench.

4. A speed reducer assembly as defined in claim 1, further comprising an indicator ring for indicating the distance the adjuster has been rotated.

* * * * *